United States Patent [19]

Hutton et al.

[11] 4,069,148
[45] * Jan. 17, 1978

[54] INDUSTRIAL WASTE WATER TREATMENT PROCESS

[75] Inventors: David Glenn Hutton, Newark; Francis Leonard Robertaccio, Hockessin, both of Del.

[73] Assignee: E. I. Du Pont de Nemours and Company, Wilmington, Del.

[*] Notice: The portion of the term of this patent subsequent to Sept. 9, 1992, has been disclaimed.

[21] Appl. No.: 147,398

[22] Filed: May 27, 1971

Related U.S. Application Data

[63] Continuation-in-part of Ser. No. 98,677, Dec. 16, 1970, abandoned, which is a continuation-in-part of Ser. No. 2,846, Jan. 14, 1970, abandoned.

[51] Int. Cl.² .......................... C02C 1/06; C02C 5/10
[52] U.S. Cl. ........................................ 210/11; 210/17; 210/18; 210/40
[58] Field of Search ........................................ 210/2-9, 210/14, 15, 17, 18, 39-41, 50, 59, 63, 11, 60

[56] References Cited

U.S. PATENT DOCUMENTS

| | | | |
|---|---|---|---|
| 1,617,014 | 2/1927 | Derleth | 210/7 |
| 1,915,240 | 6/1933 | Putnam | 210/6 |
| 2,059,286 | 11/1936 | Statham | 210/18 X |
| 3,275,547 | 9/1966 | Bucksteeg et al. | 210/18 |
| 3,300,403 | 1/1967 | Kehoe | 210/18 X |
| 3,356,609 | 12/1967 | Bruemmer | 210/7 |
| 3,401,113 | 9/1968 | Pruessner et al. | 210/7 |
| 3,490,590 | 1/1970 | Davies | 210/18 X |
| 3,803,029 | 4/1974 | Blecharczyk | 210/40 X |

FOREIGN PATENT DOCUMENTS

| | | | |
|---|---|---|---|
| 555,075 | 3/1969 | Japan | 210/18 |

OTHER PUBLICATIONS

Erganian, "Effect of Chrome Plating Wastes, Etc.," Proc. 14th, Ind. Waste Conf., Purdue Univ., 1959, pp. 127–138.
Rudolfs et al., "Activated Carbon in Sewage Treatment," *Sewage Works Jour.*, vol. 7, Sept. 1935, pp. 852,863,880.
Keefer, *Sewage Treatment Works*, First Ed., McGraw-Hill, N.Y., 1940, pp. 308-314.
"Evaluation of Various Adsorbents, Etc.," AWTR-12, U.S. Dept. of H.E.W., June, 1964, pp. 13-22.

*Primary Examiner*—Thomas G. Wyse

[57] ABSTRACT

Industrial waste water, containing impurities which poison or otherwise inhibit bacterial forms employed in biological treatment of waste water, is purified by a process which comprises subjecting the waste water to a biological treatment process in the presence of activated carbon or fuller's earth. A gas containing molecular oxygen is distributed within the liquid mixture during treatment to provide oxidation means. Despite the presence of the poisonous or inhibiting impurities, the process efficiently reduces the biochemical oxygen demand, chemical oxygen demand and total organic content of the waste water in an unusually rapid manner, and removes material not normally removed by the biological treatment alone.

8 Claims, 1 Drawing Figure

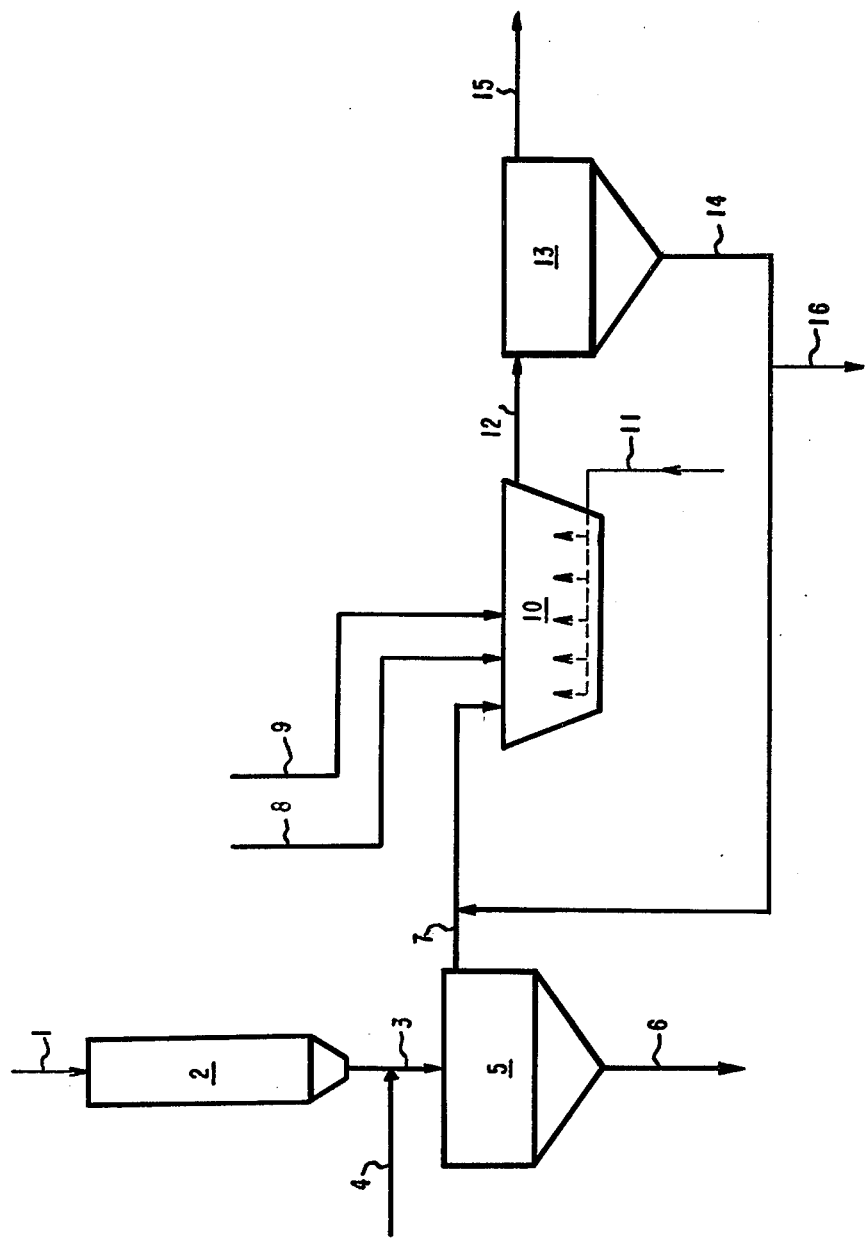

4,069,148

INDUSTRIAL WASTE WATER TREATMENT PROCESS

CROSS-REFERENCE TO RELATED APPLICATIONS

This application is a continuation-in-part of copending application Ser. No. 98,677, now abandoned filed Dec. 16, 1970 which in turn is a continuation-in-part of application Ser. No. 2,846 filed Jan. 14, 1970, now abandoned.

BACKGROUND OF THE INVENTION

1. Field of the Invention

This invention relates to a process for purifying industrial waste water. "Industrial waste water" is used herein to mean those waste waters which are primarily of non-domestic origin. Of course the presence of some domestic waste water, as would be present in a large regional treatment facility, is expected, but does not change the essential nature of the waste water from primarily non-domestic. More specifically the invention is directed to a biological process for treating industrial waste water containing impurities which poison or inhibit bacterial forms employed in biological treatment of waste water.

2. Background of the Invention

The growing problem of water pollution has received wide recognition with the increased public interest. Moreover waste water from industrial operations is often given minimal treatment consisting of neutralization of excessive acidity or alkalinity and settling of solids before the treated water is passed into a river, lake or ocean. The treatment corresponds roughly to the familiar primary treatment of municipal sewage. Occasionally, further treatment of the water is carried out through the action of aerobic bacteria on the waste pollutants. This further treatment, known as "secondary" treatment involves the biological decomposition of the waste pollutants by supplying oxygen to bacteria which feed on the combination of oxygen and nutriments in the waste, thereby breaking down much of the waste material into removable solids and carbon dioxide. This "secondary" treatment is commonly practiced by the means of the trickling filter process, oxidation ponds or the activated sludge process. However with those waste waters containing impurities poisonous to bacterial forms employed in these secondary treatments the biological decomposition is inhibited. A "tertiary" treatment, usually treatment with chemicals, is sometimes carried out and is directed to the removal of specific objectionable materials, e.g., ion exchange resins may be used to reduce inorganic content or activated carbon may be used to remove color.

The quantity of pollutants in waste water is commonly determined by measuring the amount of dissolved oxygen required to biologically decompose the waste organic matter in the polluted water. This measurement, called BOD (biochemical oxygen demand), provides an index of the organic pollution of water. Some organic contaminants, such as chlorinated aromatics, are not amenable to conventional biological decomposition and tests such as chemical oxygen demand (COD) and total organic carbon (TOC) have been employed.

Because of the increases in population and industrialization, it is desirable to reduce the time of total waste water treatment and to increase the capacity of treatment plant facilities. Further, since biological degradation is sometimes not satisfactory with industrial wastes which contain the poisonous or inhibiting impurities referred to above, e.g. waste from chemical plants, it is highly desirable to provide a waste treatment process which will accomplish "secondary treatment" and produce a purified effluent comparable to that provided by secondary treatment of municipal waste water.

A process has now been discovered which accomplishes these ends. This process efficiently reduces the biochemical oxygen demand, chemical oxygen demand, and total organic content of the waste water in an unusually rapid manner. In addition the process of this invention greatly increases the rapidity and completeness of sludge settling after treatment of the waste water in an activated sludge process and effectively removes many organic impurities no normally bio-degradable. This process can be employed with industrial waste water alone or with mixtures of industrial waste water and sewage or other waste water.

SUMMARY OF THE INVENTION

In summary this invention is directed to a process for continuously purifying industrial waste water containing impurities poisonous to bacterial forms employed in biological treatment of waste water, said process comprising A. contacting in a treatment zone a mixture of
  1. industrial waste water which has a pH of between about 4 and 11 and which optionally has been subjected to primary treatment to remove solids,
  2. biologically active solids in an amount sufficient to provide a total suspended solids content of the mixture of between about 10 and 50,000 parts per million, and
  3. between about 5 and 1500 parts of activated carbon or between about 25 and 2500 parts of adsorptive fuller's earth per million parts of feed waste water, said carbon or fuller's earth having a surface area of at least 100 square meters per gram and a particle size such that it will pass through a 200 mesh per inch sieve, B. mixing a gas containing molecular oxygen through the mixture, and C. removing the mixture from the treatment zone.

DESCRIPTION OF THE DRAWING

The drawing is a schematic representation of the steps involved in one form of water treatment facility for the treatment of waste water as described herein.

DESCRIPTION OF THE INVENTION

Industrial waste water to be purified by the process of this invention should first be treated, as required and if necessary, to adjust the pH to between 4 and 11, preferably to between 6 and 9, and most preferably to about 7±0.5. This can be achieved by treating acidic waste with lime, limestone, sodium hydroxide or other base, or by treating alkaline waste water with an acid such as sulfuric or hydrochloric acid. When these neutralization processes produce excessive precipitation, or the waste water otherwise contains excessive solids, it may be clarified by settling, decantation or filtration to provide an effluent practically free of solid products.

After the above pre-treatment steps, the waste water is passed into a treatment zone where it is purified by a biological oxidation treatment in the presence of adsorptive (activated) carbon or fuller's earth. The adsorptive carbon or fuller's earth can be added to the water just prior to entry of the water in the treatment zone, it can be present in the treatment zone prior to entry of the water, or it can be added to the zone after the waste water has entered. In a continuous process, it is preferably added to the zone as fresh waste water enters.

It is important that the amount of carbon or fuller's earth employed provide between 4 and 1000 square meters of surface per liter of waste water treated. The carbon or fuller's earth must be finely divided. By the term "finely divided" is meant that the carbon or fuller's earth should be of such particle size that it will pass through a 200 mesh per inch sieve. In addition the carbon or fuller's earth should have a surface area of at least 100 square meters per gram. The surface area can be measured by the method of Brunauer et al., J. Am. Chem. Sci. 60 309 (1938). Activated carbon having a surface area of about 1400 square meters per gram can be obtained commercially, but this figure does not represent a maximum figure for use in the process of this invention.

Examples of activated carbon or fuller's earth that can be employed in the process of this invention include carbon produced from the destructive distillation of vegetable matter such as lignite, coal, pulp mill residues, nut shells and petroleum residues. As used herein the term fuller's earth is defined as that group of highly sorptive clays that are crystalline, hydrated magnesium aluminum silicates characterized by a chain-like structure and a high surface area. Examples of fuller's earth include attapulgus clay (consisting of 80–90% attapulgite). Activated carbon is preferred because of its higher surface area and unique surface properties which provide for greater efficiency of the process.

Because activated carbon usually has more surface area per gram than the fuller's earth, e.g., activated carbon can have a surface area of between 600–1400 square meters per gram (Aqua Nuchar has a surface area of 675 square meters per gram), while commercial mathlite fuller's earth has a surface area of 124 square meters per gram, the preferred amount of activated carbon employed in the process will be less than the amount of fuller's earth required. It will be understood that where the character of the waste water is not constant, no absolute prescription for surface area requirements can be provided. Moreover, rate of carbon or fuller's earth application will vary as the requirements of the treated waste water vary.

Normally the ratio of parts per million carbon to parts per million BOD fed will range between 0.25 and 5 Lower ratios of carbon to BOD have not shown measurable improvement in numerous experiments with activated sludge processes. However, it might be expected that lower ratios could be effective in oxidation ponds. Higher ratios, while operable, are not economically desirable.

The biologically active solids employed can be the same type solids that are presently used in the commonly called "activated sludge" process of water purification or those active solids found in oxidation ponds and other biological water treatment processes. It is preferable in the operation of the process of this invention, that the waste water in the treatment zone contain a concentration of total suspended solids of between about 25 and 15,000 parts per million. However, the benefits of this invention are realized even when total solids are as low as about 10 parts per million, or as high as about 50,000 parts per million. If it is found necessary to add biologically active solids to fulfill the concentration requirements, domestic sewage sludge, as from a city sewage plant activated sludge aerator, can be employed. Of course, once an activated sludge process produces its own biologically active solids, the solids are ordinarily recycled to ensure proper level of bacterial concentration. The oxidation pond process, once it has reached a suitable concentration of biologically active solids tends to maintain that level without solids addition. The term "biologically active solids" as used herein refers to its normal meaning in biological treatment processes for waste water. Specifically it is those suspended solids which contain different types of bacteria formed by contacting waste water. In the process of this invention the total suspended solids include the activated carbon or fuller's earth and the biologically active solids.

Once the waste water, biologically active solids and carbon or fuller's earth are in the treatment zone, oxygen is supplied to the mixture, usually by supplying air, and preferably by means of spargers or similar distributors in a manner which causes dissolution of oxygen in the liquid mixture and which provides agitation to mix the ingredients of the mixture. Additional agitation may also be provided by mechanical stirrers.

Reaction time can range from about 2 hours to about 30 days or more. The process is conveniently conducted at temperatures between about 5° and 35° C. and at atmospheric pressure. These time, temperature and pressure conditions are not critical. Preferably the process is carried out continuously and the flow rates are adjusted to provide a reaction time of about two to ten hours for activated sludge processes and about two to ten days for oxidation ponds.

Nitrogen and phosphorus are both essential nutrients for the metabolism of biological life forms, and if they are not already present in the waste water mixture, they can be added, for example in the form of ammonium phosphate salt. Although not critical, the weight ratio of BOD feed, nitrogen atoms and phosphorus atoms is usually about 100:5:1, although more nitrogen and phosphorus can be present.

After treatment in the treatment zone, the liquid mixture may be suitable for reuse as is, but is frequently passed into a separation zone where the biologically active solids and carbon or fuller's earth are separated from the water, usually by settling. A portion of the biologically active solids is returned to the treatment zone in order to maintain proper concentration of solids in the traditional activated sludge process.

The process of this invention generally reduces the amount of $BOD_5$ (five day biochemical oxygen demand) by over 95%; whereas the conventional biological processes generally result in less $BOD_5$ removal when there are no poisonous impurities present and result in much less $BOD_5$ removal when such impurities are present in the industrial waste water.

Referring now to the drawing, which schematically represents an activated sludge process, one embodiment of the above-described treatment, stream 1 represents settled waste water entering the treatment system. Column 2 represents a limestone packed column where any gross acidity can be neutralized. The effluent from column 2 proceeds via line 3 to clarifier 5, the pH of the water being adjusted en route to about 6.5 to 7.5 by addition of base, e.g., sodium hydroxide, solution through line 4. In clarifier 5 any solids formed in the neuralization are settled out and removed via line 6. The clear effluent from clarifier 5 proceeds via line 7 to the treatment zone 10, where the biological oxidation occurs. An aqueous slurry of activated carbon is added through line 8, and nutrient for the bacteria in the form of phosphate and/or ammonium salts in water solution is added through line 9, if required. As discussed above, while municipal sewage contains ample amounts of these nutrients, the more specialized types of waste from industrial plants may lack them, and they must be added in order to maintain vigorous bacterial action. In the treatment zone 10 bacterial oxidation of waste occurs in the presence of the activated carbon and air or oxygen added through line 11. The air or oxygen is added through a sparger or other device to aid in agitation of the reaction zone contents as well as provide oxygen to the aerobic bacteria. (An aeration time of about 2½ hours has been found to be sufficient for the successful oxidation of a chemical plant waste.) The treatment zone 10 must be sized to provide the desired amount of contact of waste water, bacteria, oxygen and activated carbon. Also added to the mixture in the treatment zone 10 is a flow of settled sludge from the clarifier 13 through lines 14. This is the sludge which steadily renews and maintains the activity necessary for oxidation and removal of the impurities in the waste water. After the necessary residence time, the continuously flowing treated waste is led to the clarifier 13 through line 12. In the clarifier 13 the carbon-containing sludge settles, and the clear effluent water overflows to river or stream or to re-use through line 15. As described before, some of the settled sludge from the clarifier 13 is returned through lines 14 to the treatment zone 10. The remainder of the sludge is removed through line 16 to be treated for recovery and reactivation of the carbon, or, where economically more advantageous, to be discarded. The process can be operated similarly by replacing the activated carbon with adsorptive fuller's earth.

Of course, in the operation of the process of this invention, certain additional steps may follow or precede it. These additional steps will depend upon local conditions. For example, one such additional step is aeration for removal of odoriferous gases, such as hydrogen sulfide. Another example is coagulation of solid contaminants with inorganic materials or organic polymers. It is even conceivable that oxidation pond treatment might be used in conjunction with an activated sludge treatment, with activated carbon or fuller's earth employed in either or both. The process of this invention is compatible with such steps, for it is not concerned with primary sewage treatment, now with odor or color removal per se, nor with treatment of sludge itself.

As pointed out above, the process of this invention overcomes the problem growing out of the presence of poisonous impurities in industrial waste water which reduce the effectiveness of biological treatment of waste water. Such impurities as phenolic and halogenated compounds as well as heavy metal compounds both organic and inorganic are poisonous to some bacterial forms and are frequently found in industrial waste waters. Surprisingly, even very small amounts of adsorptive carbon or fuller's earth are effective in segregating such poisonous materials from contact with the bacteria, permitting normal bacterial activity to occur.

The process of this invention is particularly effective for use with industrial wastes containing heavy metal compounds, and $Cr^{++++++}$ or $Co^{++}$ metal ions in particular. For such operations it is preferred to use activated carbon rather than fuller's earth and it is further preferred to use the carbon in amounts ranging between about 40 and 1500 parts per million parts of waste water.

Moreover, through the use of finely divided activated carbon or fuller's earth, the activated sludge process for the treatment of waste water is significantly improved upon. Not only does the presence of carbon or fuller's earth cause a segregation of poisonous impurities, but it also causes greater percentage of BOD removal, and it does so in a much shorter time. For example, in identical procedures, the activated sludge process with no activated carbon present showed a BOD percent removal of 68% and a TOC percent removal of 60% at an aeration time of 7.6 hours; while when activated carbon was added, BOD removal percentage was 95% and TOC removal percentage was 85%, at an aeration time of only 2.5 hours (a 67% reduction in time of aeration).

Another important advantage of the use of activated carbon or fuller's earth in an activated sludge process is in the rapidity and the completeness with which the sludge settles after treatement in the treatment zone. The presence of these additives apparently induces a rapid settling of the sludge which is more complete than a settling when the additives are not present. In addition, the sludge is of a greater density than it is in the process not using carbon or fuller's earth.

Another advantage of the use of activated carbon or fuller's earth in biological treatment of waste water is in a "smoothing out" of the variations in efficiency caused by changes in the non-poisonous impurity concentration of the feed waste water composition. The activated carbon of fuller's earth absorb impurities to a greater degree as impurity concentration increases and desorb the non-poisonous impurities whenever their concentration decreases.

Still another advantage of the process of this invention is that it provides, in a continuous process, effective removal of many non-biodegradable organic impurities which are often a part of industrial waste streams. Furthermore, the presence of the activated carbon aids in removing from the waste water color, odors, and contaminants which cause foam.

In summary, the process of this invention not only provides a more effective process, but it can reduce the size of treatment zones needed to process a selected volume of waste water over that necessary in present biological treatment processes, thus lowering initial plant cost. In addition it can increase the efficiency of treatment over that of present biological treatment processes for a particular volume of waste water by lowering treatment time and allowing higher flow rates. It provides, without a multiplicity of steps, a process which removes BOD, colored impurities and refractory organic compounds, offering a solution to the new problems involved in the purification of many industrial effluents. The apparent synergistic action of activated carbon or fuller's earth in the biological environment is surprising and unexpected, and affords a significant improvement in waste water treatment technology.

In the Examples which follow, BOD and COD were determined in accordance with the procedures provided on pages 415 and 510 respectively of "Standard Methods for Examination of Water and Waste Water", 12th edition, 1965, published by The American Public Health Association, the American Water Works Association and the Water Pollution Control Federation. Total Organic Carbon Content was determined with a carbonaceous analyzer (Beckman Instruments Co., Model 915). Surface area of the activated carbon or fuller's earth employed can be determined by the nitrogen adsorption method of Brunauer, Emmett and Teller, J.Am. Chem.Soc. 60, 309 (1938).

The Examples below are intended to be illustrative only and are not to be considered limiting.

EXAMPLE 1

An industrial waste water derived from a large multiproduct chemical plant was used as feed in this experiment. The water contained dissolved organic chemicals, some heavy metals including lead and 3000 parts per million of dissolved inorganic salts. Using the apparatus shown in FIG. 1, the feed water after preliminary settling of gross solids was passed through a bed of limestone chips, and the pH adjusted to about 7.0 with sodium hydroxide solution. Precipitated solids were removed by settling and the almost clear waste water was treated in parallel experiments in a conventional activated sludge system on one hand and in an equivalent activated sludge system employing powdered activated carbon (Aqua Nuchar A) on the other. After about three weeks of operation to insure that the systems were stabilized, they were operated at about the same feed rate for a period of one month. The system using carbon according to the conditions shown in Table 1 provided an effluent with lower BOD, lower TOC, and substantial removal of color compared to the conventional system. The sludge volume index for the carbon system was much lower and thus more efficient than in the conventional system. Data from these tests are shown in Table I, below. The aeration time is calculated by dividing the aerator volume by the waste water feed rate.

TABLE I

|  | Without Carbon | With Carbon |
|---|---|---|
| Carbon dosage, ppm based on feed | 0 | 52 |
| Aeration time, hours | 2.69 | 2.47 |
| BOD of feed mg./liter | 69.2 | 69.2 |
| BOD of effluent mg./liter | 17.6 | 11.1 |
| % BOD removal | 76.2 | 83.5 |
| TOC of feed mg./liter | 66.0 | 66.0 |
| TOC of effluent mg./liter | 35.0 | 28.4 |
| % TOC removal | 46.9 | 57.0 |
| Color - APHA standards | 500 | 100 |
| Sludge Volume Index, ml./gram | 62 | 20 |
| Mixed liquor suspended solids, g./liter | 1.60 | 5.75 |

The above experiments were performed at about 22° C. It will be noted that the mixed liquor suspended solids in the system using carbon were much higher than in the other system. This resulted from the fact that the carbon system gave much better settling and a much more dense sludge, thus it was possible to return more sludge to the aeration tank. It has often been found that the solid products from activated sludge treated industrial wastes settle poorly, a large proportion of sludge thus exiting with the product water, thereby negating the effectiveness of the overall treatment. The carbon treatment of this invention has great value in such situations.

EXAMPLE 2

The operations of Example 1 were continued except that the feed water after the limestone treatment was brought to pH 9 by adding sodium hydroxide solution, thereby precipitating heavy metals, and clarified by settling, then readjusting to pH 7 by adding hydrochloric acid before the water entered the aerator. Comparative data for one month's operation on the so treated waste water in carbon and no-carbon activated sludge systems are shown in Table II.

TABLE II

|  | Without Carbon | With Carbon |
|---|---|---|
| Carbon dosage, ppm based on feed | 0 | 49 |
| Aeration time, hours | 2.66 | 2.55 |
| BOD of feed mg./liter | 91.8 | 91.8 |
| BOD of effluent, mg./liter | 26.8 | 13.2 |
| % BOD removal | 71.8 | 85.5 |
| TOC of feed, mg./liter | 73.7 | 73.7 |
| TOC of effluent, mg./liter | 42.3 | 31.4 |
| % TOC removal | 42.9 | 56.8 |
| Color, APHA standards | 500 | 100 |
| Sludge Volume Index, ml./gram | 104 | 30 |
| Mixed liquor suspended solids, g./liter | 1.23 | 4.05 |

EXAMPLE 3

A preliminarily treated waste water similar to that of Example 2 but containing 2 ppm of chromium in the form of chromic trioxide was treated as in Example 2. Three test systems were operated side-by-side to compare the effect of the presence of chromium on activated sludge systems in the presence and absence of carbon. Chromium was shown to be detrimental to BOD and TOC removal, however the use of carbon greatly improved the results, even compared to conventional treatment of the waste water containing no chromium. Data from these tests is shown in Table III.

TABLE III

|  | No Carbon | | With Carbon |
|---|---|---|---|
|  | No Chromium | With Chromium | With Chromium |
| Carbon dosage, ppm | 0 | 0 | 44 |
| Chromium content, ppm | 0 | 2 | 2 |
| Aeration time, hours | 2.6 | 2.5 | 2.4 |
| BOD of feed mg./liter | 83.7 | 83.2 | 83.7 |
| BOD of effluent mg./liter | 19.7 | 26.0 | 17.3 |
| % BOD removal | 77.4 | 68.0 | 78.9 |
| TOC in feed, mg./liter | 71.2 | 71.2 | 71.2 |
| TOC in effluent mg./liter | 37.4 | 42.6 | 34.0 |
| % TOC removal | 47.6 | 39.6 | 52.2 |
| Color, APHA standards | 500 | 500 | 100 |
| Sludge Volume Index, ml./gram | 87 | 11 | 26 |
| Mixed Liquor suspended solids, g./liter | 1.5 | 2.7 | 3.0 |

EXAMPLE 4

Example 3 was repeated with the waste water of Example 3 but containing 1.5 ppm of cobalt as (CoSO$_4$.7H$_2$O) rather than 2 ppm Chromium as in Example 3. Similar results were obtained. The metal decreased the efficiency of BOD and TOC removal but the presence of carbon minimized this effect. Results obtained with carbon were even better in several categories than those obtained with conventional treatment in the absence of cobalt. Data are shown in Table IV. Turbidity was measured with a Hach Chemical Co. turbidity meter, and expressed in Jackson turbidity units.

TABLE IV

|  | No Carbon | | With Carbon |
|---|---|---|---|
|  | No Cobalt | With Cobalt | With Cobalt |
| Carbon dosage, ppm | 0 | 0 | 40 |
| Cobalt content, ppm | 0 | 1.5 | 1.5 |
| Aeration time, hours | 2.8 | 2.6 | 2.3 |
| BOD of feed, mg./liter | 69.6 | 69.6 | 69.6 |

TABLE IV-continued

|  | No Carbon | | With Carbon |
|---|---|---|---|
|  | No Cobalt | With Cobalt | With Cobalt |
| BOD of effluent, mg./liter | 9.3 | 24.6 | 12.9 |
| % BOD removal | 86.2 | 66.7 | 82.7 |
| TOC in feed, mg./liter | 78.7 | 78.7 | 78.7 |
| TOC in effluent, mg./liter | 41.8 | 50.8 | 41.9 |
| % TOC removal | 46.2 | 35.2 | 46.3 |
| Color, APHA standards | 500 | 500 | 150 |
| Sludge Volume Index, ml./liter | 86 | 67 | 42 |
| Mixed liquor suspended solids, g./liter | 1.92 | 0.71 | 2.11 |
| Turbidity-Jackson turbidity units | 14 | 18 | 16 |

EXAMPLE 5

The experiment of Example 1 was continued over a period of 2 to 3 months but at a lower (20 ppm) carbon dosage. In this experiment little difference was seen in BOD or TOC removal, however significant improvement in color, turbidity and sludge volume index were realized even at this low carbon treatment level. Data are shown in Table V.

TABLE V

|  | Without Carbon | With Carbon |
|---|---|---|
| Carbon dosage, ppm | 0 | 20 |
| Aeration time, hours | 2.47 | 2.51 |
| BOD in feed, mg./liter | 84.1 | 84.1 |
| BOD in effluent, mg./liter | 11.9 | 13.6 |
| % BOD removal | 85.4 | 83.7 |
| TOC in feed, mg./liter | 78.5 | 78.5 |
| TOC in effluent, mg./liter | 32.2 | 31.7 |
| % TOC removal | 58.5 | 59.2 |
| Color APA standards | 500 | 300 |
| Sludge Volume Index, ml./gram | 33 | 19 |
| Effluent turbidity, JTU (Jackson Turbidity Units) | 53 | 32 |
| Mixed liquor suspended solids, g./liter | 5.4 | 4.3 |
| Grams BOD fed/day/grams of mixed liquor suspended solids | 0.15 | 0.19 |

EXAMPLE 6

In this example the performance of Fuller's earth was measured in comparison with activated Aqua Nuchar A carbon, as described in Example 1. Parallel runs were made by the procedure described in Example 1. Data resulting are shown in Table VI for different levels of treatment.

TABLE VI

| Type of Operation | Process of Invention | Process of Invention | Activated Sludge - no Carbon or Clay |
|---|---|---|---|
| Carbon, ppm of feed | 73 | — | — |
| Fuller's Earth, ppm of feed ("Emathlite" VMP-3000 from Mid-Florida Mining Company) | — | 350 | — |
| % TOC removal | 50 | 38 | 28 |
| % BOD removal | 91 | 77 | 78 |
| Aeration time, hours | 2½ | 5½ | 5 |
| ppm carbon or fuller's earth/ppm of BOD in feed | 0.9 | 2.5 | — |

The superiority of the process of the invention is clearly shown. The amount of carbon and fuller's earth used are at the low end of the desired proportion.

While the preferred application of the process of this invention is in activated sludge treatment of waste water, its use is also advantageous in conjunction with other types of biological water treatment processes including oxidation ponds such as those sometimes employed by the food, chemical, textile, and paper industries and described more fully in "Industrial Waste Water Control" by C. Fred Gurney, 1965, Academic Press, N.Y., N.Y.

The foregoing detailed description of this invention has been given only for clarity and understanding and no unnecessary limitations are to be construed therefrom. The invention is not limited to the exact details shown and described, as obvious modifications will occur to those skilled in the art.

The embodiments of the invention in which an exclusive property or privilege is claimed are defined as follows:

1. A process for continuously purifying industrial waste water containing impurities which inhibit or poison bacterial forms employed in biological treatment of waste water, said process consisting of:
   A. contacting in a treatment zone a mixture of
      1. industrial waste water which has a pH of between about 4 and 11 and which optionally has been subjected to primary treatment to remove solids,
      2. biologically active solids in an amount sufficient to provide a total suspended solids content of the mixture of between about 10 and 50,000 parts per million, and
      3. activated carbon added at a rate sufficient to supply between about 4 and about 1,000 square meters of surface area of carbon for every liter of waste water supplied to the treatment zone said carbon having a surface area of at least 100 square meters per gram and a particle size such that it will pass through a 200 mesh per inch sieve,
   B. mixing a gas containing molecule oxygen through the mixture for a period of at least about 2 hours, and
   C. removing the mixture from the treatment zone.

2. The process of claim 1 wherein the total solids content of (A)(2) is between about 25 and 15,000 parts per million, the mixture is agitated in (B) as the gas is mixed, and solids are separated from the water in step (C) after the mixture is removed from the treatment zone.

3. The process of claim 2 in which nitrogen salts, phosphorus salts or their mixtures are introduced into the treatment zone during the carrying out of step (A).

4. A process for continuously purifying industrial waste water, said process consisting of:
   A. contacting in a treatment zone a mixture of
      1. industrial waste water which has a pH between about 4 and 11 and which optionally has been subjected to primary treatment to remove solids,
      2. activated sludge in an amount sufficient to provide a total solids content of the mixture between about 300 and 50,000 parts per million and
      3. activated carbon added at a rate sufficient to supply between about 4 and about 100 square meters of surface area of carbon for every liter of waste water supplied to the treatment zone said carbon having a surface area of at least 100 square meters per gram and a particle size such that it will pass through a 200 mesh per inch sieve,
   B. mixing a gas containing molecular oxygen through the mixture for a period of at least about 2 hours, and
   C. removing the mixture from the treatment zone and separating solids from the supernatant water.

5. The process of claim 4 in which components (1) and (2) of step (A) are combined prior to entry into the treatment zone.

6. The process of claim 4 wherein the ratio of ppm of activated carbon to ppm of BOD feed is maintained between 0.25 and 3.5.

7. The process of claim 4 wherein the total solids content of (A)(2) is between about 300 and 15,000 parts per million and the mixture is agitated in (B) as the gas is mixed.

8. The process of claim 7 wherein the waste water feed has a pH of between about 6.5 and 7.5; the waste water is fed to a treatment zone containing an aqueous slurry of activated sludge, and activated carbon which has a surface area between about 600 and 1,000 square meters per gram; a portion of the agitated mixture is removed continuously; and there is continuously fed to the treatment zone waste water, activated sludge and activated carbon at such rates that the amount of total mixed liquor solids in the treatment zone is maintained at a concentration between about 300 and 15,000 parts per million.

* * * * *

Disclaimer 4,069,148.—*David Glenn Hutton*, Newark and *Francis Leonard Robertaccio*, Hockessin, Del. INDUSTRIAL WASTE WATER TREATMENT PROCESS. Patent dated Jan. 17, 1978. Disclaimer filed Apr. 9, 1980, by the assignee, *E. I. Du Pont De Nemours and Company*.

Hereby enters this disclaimer to claims 1, 2 and 3 of said patent.

[*Official Gazette July 8, 1980.*]

UNITED STATES PATENT AND TRADEMARK OFFICE
CERTIFICATE OF CORRECTION

PATENT NO. : 4,069,148

DATED : January 17, 1978

INVENTOR(S) : David Glenn Hutton
Francis Leonard Robertaccio

It is certified that error appears in the above-identified patent and that said Letters Patent is hereby corrected as shown below:

Claim 4, Column 10, line 56, "100" should be --1,000--.

Signed and Sealed this

Twenty-fourth Day of December, 1991

Attest:

HARRY F. MANBECK, JR.

*Attesting Officer*  *Commissioner of Patents and Trademarks*